(12) United States Patent
Shepard

(10) Patent No.: US 9,033,290 B2
(45) Date of Patent: May 19, 2015

(54) RELEASABLE SECURING MECHANISM

(71) Applicant: Kirkhill-TA Co., Valencia, CA (US)

(72) Inventor: Ryan John Shepard, Burbank, CA (US)

(73) Assignee: Kirkhill-TA Co., Valencia, CA (US)

( * ) Notice: Subject to any disclaimer, the term of this patent is extended or adjusted under 35 U.S.C. 154(b) by 0 days.

(21) Appl. No.: 14/221,230

(22) Filed: Mar. 20, 2014

(65) Prior Publication Data

US 2014/0284432 A1 Sep. 25, 2014

Related U.S. Application Data

(60) Provisional application No. 61/803,701, filed on Mar. 20, 2013.

(51) Int. Cl.

| F16L 3/10 | (2006.01) |
|---|---|
| F16L 3/11 | (2006.01) |
| F16L 3/12 | (2006.01) |
| F16L 55/035 | (2006.01) |
| F16L 3/13 | (2006.01) |

(52) U.S. Cl.
CPC .............. *F16L 3/1025* (2013.01); *F16L 3/1083* (2013.01); *F16L 3/13* (2013.01); *F16L 3/11* (2013.01); *F16L 3/12* (2013.01); *F16L 55/035* (2013.01)

(58) Field of Classification Search
CPC .............. F16L 3/1025; F16L 3/10; F16L 3/11; F16L 3/13; F16L 33/1058; F16L 3/1083
USPC ............ 248/62, 65, 73, 74.1, 74.2; 24/20 EE, 24/598.1; 174/40 CC
See application file for complete search history.

(56) References Cited

U.S. PATENT DOCUMENTS

| 2,466,247 | A | * | 4/1949 | Land ............................. 248/62 |
|---|---|---|---|---|
| 2,947,055 | A | * | 8/1960 | McHenry .................... 24/20 EE |
| 3,330,517 | A | * | 7/1967 | Zimmermann ................ 248/62 |
| 4,380,102 | A | * | 4/1983 | Hansson ........................ 24/459 |
| 4,674,720 | A | * | 6/1987 | Fetsch .......................... 248/74.1 |
| 4,783,029 | A | | 11/1988 | Geppert et al. |
| 5,842,725 | A | | 12/1998 | Allert |
| 6,138,960 | A | * | 10/2000 | Carbonare et al. ............. 248/62 |

(Continued)

OTHER PUBLICATIONS

International Search Report and Written Opinion, PCT/US2014/031378; Mailing Date: Aug. 18, 2014; Applicant: Kirkhill-TA Co., 12 pages.

*Primary Examiner* — Tan Le
(74) *Attorney, Agent, or Firm* — Perkins Coie LLP

(57) ABSTRACT

A line retention device configured to releasably retain one or more lines therebetween. The device has a retention bracket with a female detent on a first end portion and having a receiving aperture defined by a primary opening and a keyway. A male detent is on a second end portion and has a proximal portion, a head portion, and an intermediate portion. The intermediate portion extends through the receiving aperture when the retention bracket is in the closed position with proximal and head portions on one side of the female detent and the intermediate portion on the opposite side of the female detent. The intermediate portion is configured to flex between a first, relaxed position with a necked down portion in the keyway so the male detent is blocked from moving out of the female detent portion and a second release position wherein the necked down portion is out of the keyway and aligned with the primary opening so the male detent can pass through the primary opening to move the retention bracket from the closed position to the open position.

20 Claims, 8 Drawing Sheets

(56) References Cited

U.S. PATENT DOCUMENTS

| | | | |
|---|---|---|---|
| 7,540,071 B2 * | 6/2009 | Sampson | 24/284 |
| 7,546,986 B2 | 6/2009 | Kim | |
| 8,267,357 B2 * | 9/2012 | Kataoka et al. | 248/73 |
| 8,322,662 B2 * | 12/2012 | Heath et al. | 248/62 |
| 2012/0119055 A1 | 5/2012 | Mimura | |
| 2014/0284432 A1 * | 9/2014 | Shepard | 248/74.2 |

* cited by examiner

RELEASABLE SECURING MECHANISM

CROSS-REFERENCE TO RELATED APPLICATION

This application claims the benefit of and priority to U.S. Provisional Patent Application No. 61/803,701, titled Releasable Securing Mechanism, filed Mar. 20, 2013, which is incorporated herein in its entirety by reference thereto.

TECHNICAL FIELD

The following disclosure relates generally to devices, systems and methods of manufacture for securing mechanisms that releasably secure an object or payload to a separate structure.

BACKGROUND

Various types of securing mechanisms, such as line blocks, clamps, cable clamps, etc., are known in the art for securing objects to a selected payload or other support structure. However, many of the designs that have been implemented suffer from drawbacks. These drawbacks can include labor intensive manufacturing, assembly and installation, and parts that may be susceptible to less optimal performance over time. Accordingly, it is desirable to provide a releasable securing mechanism that does not suffer from these problems.

SUMMARY

The present disclosure is directed to a releasable securing mechanism that overcomes drawbacks experienced in the prior art and provides additional benefits. At least one aspect of the releasable securing mechanism in accordance with the present disclosure comprises a line retention device for use one or more selected lines. The line retention device comprises a retention bracket assembly having releasably engageable first and second end portions and a middle portion therebetween. The retention bracket is movable between an open position wherein the first and second end portions are out of engagement with each other and a closed position wherein the first and second end portions are in releasable engagement with each other with the retention bracket configured to retain the one or more selected lines therein. The first end portion has a female detent with a receiving aperture defined by a primary opening and a keyway extending away from the primary opening. The primary opening has a first width and the keyway has a second width narrower than the first width. The second end portion has a male detent with a proximal portion, a head portion, and an intermediate portion connected to the proximal and head portions. The intermediate portion is sized to extend at least partially through the receiving aperture when the retention bracket is in the closed position. The proximal and head portions are wider than the first width of the primary opening and are sized to not fit through the primary opening. The intermediate portion has a third width less than the first width of the primary opening and greater than the second width of the keyway. The intermediate portion has a necked down portion connected to the head portion and spaced apart from the proximal portion, wherein the necked down portion has a fourth width narrower than the second width of the keyway. When the retention bracket is in the closed position the intermediate portion extends through the receiving aperture with the necked down portion positioned in the keyway with the intermediate portion positioned on one side of the female detent adjacent to the keyway, and the head portion and the proximal portion are positioned on an opposite side of the female detent adjacent to the keyway. The intermediate portion is configured to flex between a first, relaxed position with the necked down portion in the keyway so the male detent is blocked from moving out of the female detent portion and a second release position wherein the necked down portion is out of the keyway and aligned with the primary opening so the male detent can pass through the primary opening to move the retention bracket from the closed position to the open position.

Another aspect of the present disclosure provides a line retention device comprising a core portion having an interior engagement portion configured to engage and hold the one or more selected lines. A retention bracket is connected to at least a portion of a perimeter area of the core portion. The retention bracket has releasably engageable first and second end portions and a middle portion therebetween. The retention bracket being movable between an open position wherein the first and second end portions are out of engagement with each other and a closed position wherein the first and second end portions are in releasable engagement with each other. The first end portion has a female detent with a receiving aperture defined by a primary opening and a keyway extending away from the primary opening. The primary opening has a first width and the keyway has a second width narrower than the first width. The second end portion has a male detent with a proximal portion, a head portion, and an intermediate portion connected to the proximal and head portions. The intermediate portion is sized to extend at least partially through the receiving aperture when the retention bracket is in the closed position. The proximal portion and head portion are wider than the first width of the primary opening and are sized to not fit through the primary opening. The intermediate portion has a third width less than the first width of the primary opening and greater than the second width of the keyway. The intermediate portion has a necked down portion connected to the head portion and spaced apart from the proximal portion. The necked down portion has a fourth width narrower than the second width of the keyway. When the retention bracket is in the closed position the intermediate portion extends through the receiving aperture with the necked down portion positioned in the keyway with the intermediate portion positioned on one side of the female detent adjacent to the keyway, and the head portion and the proximal portion are positioned on an opposite side of the female detent adjacent to the keyway. The intermediate portion is configured to flex between a first, relaxed position with the necked down portion in the keyway so the male detent is blocked from moving out of the female detent and a second release position wherein the necked down portion is out of the keyway and aligned with the primary opening so the male detent can pass through the primary opening to move the retention bracket from the closed position to the open position.

Another aspect of the present disclosure provides a line block assembly for use one or more selected lines. The assembly comprises a core portion having an interior engagement portion configured to engage and hold the one or more selected lines. A retention bracket is connected to at least a portion of a perimeter area of the core portion. The retention bracket has releasably engageable first and second end portions and a middle portion therebetween. The retention bracket is movable between an open position wherein the first and second ends are out of engagement with each other and a closed position wherein the first and second ends are in releasable engagement with each other. The first end portion has a female detent with a receiving aperture defined by a primary opening and a keyway extending away from the primary opening, wherein the primary opening has a first width and the keyway has a second width narrower than the first width. The second end portion has a male detent with a proximal portion, a head portion, and an intermediate portion connected to the proximal and head portions. The intermediate portion is sized to extend at least partially through the receiving aperture when the retention bracket is in the closed position. The proximal portion and head portion are wider than the first width of the primary opening and are sized to not fit through the primary opening. The intermediate portion has a third width less than the first width of the primary opening and greater than the second width of the keyway. The intermediate portion has a distal necked down portion connected to the head portion and spaced apart from the proximal portion, wherein the distal necked down portion has a fourth width narrower than the second width of the keyway. When the retention bracket is in the closed position the intermediate portion extends through the receiving aperture with the distal necked down portion disposed in the keyway with the intermediate portion positioned on one side of the female detent adjacent to the keyway, and the head portion and the proximal portion positioned on an opposite side of the female detent adjacent to the keyway. The intermediate portion is configured to flex between a first, relaxed position with the distal necked down portion in the keyway so the male detent is blocked from moving out of the female detent and a second release position wherein the distal necked down portion is out of the keyway and aligned with the primary opening so the male detent can pass through the primary opening to move the retention bracket from the closed position to the open position.

DETAILED DESCRIPTION

The present disclosure describes a releasable securing mechanism shown in the figures as a snap lock line block assembly and a cable clamp in accordance with certain embodiments of the present invention. Several specific details of embodiments are set forth in the following description and the Figures to provide a thorough understanding of the embodiments. One skilled in the art, however, will understand that the present invention may have additional embodiments, and that other embodiments of the invention may be practiced without several of the specific features described below. Further, one skilled in the art will recognize that the releasable securing mechanism described herein could be configured in many different arrangements and embodiments. Such variations of the present disclosure may be utilized without deviating from the spirit and scope of the present invention. The various embodiments set forth below are described and shown with a level of detail to provide a thorough understanding of the disclosure. Other structures and systems that are often associated with securing mechanisms have not been fully discussed to enable a clearer presentation of embodiments of this disclosure.

Figure 1:
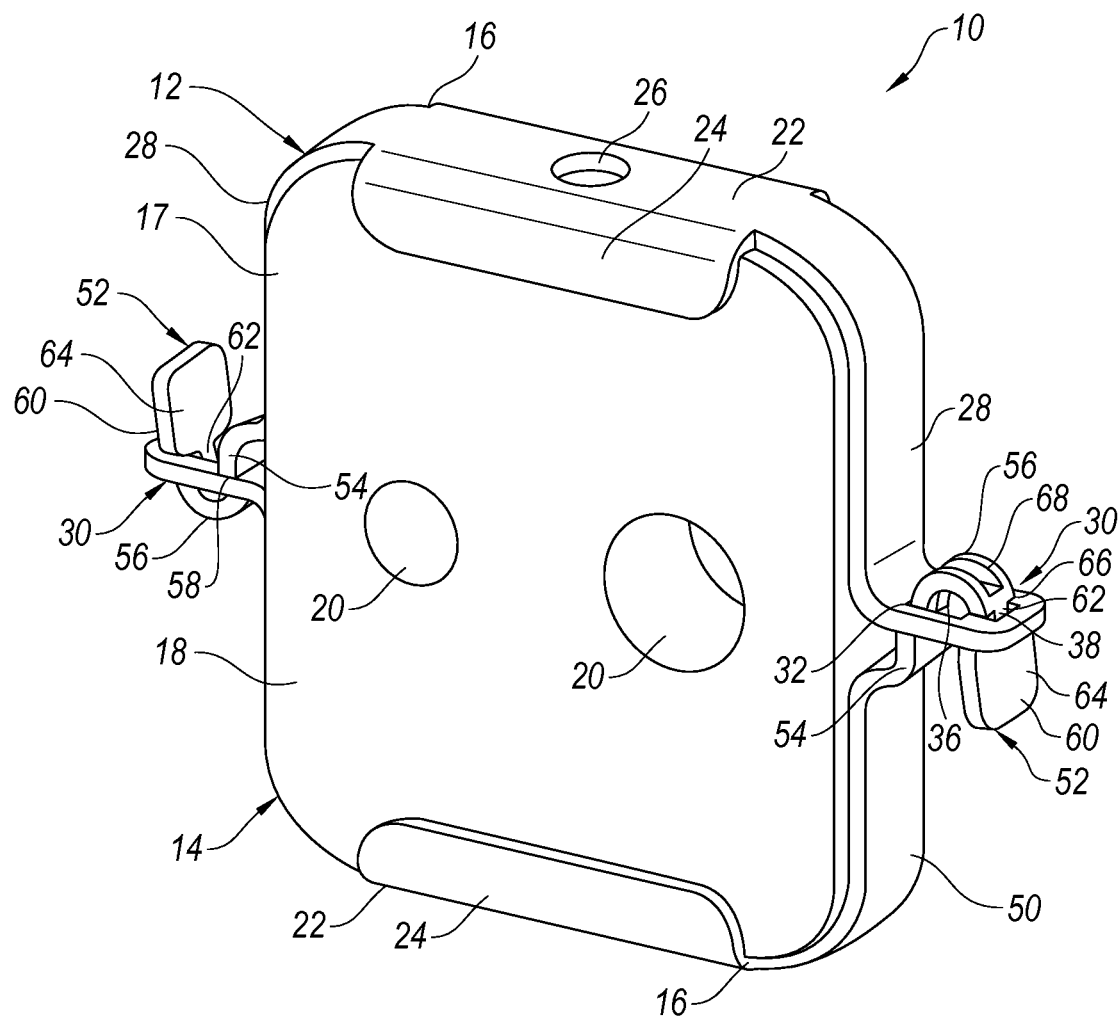
FIG. 1 is an isometric view of a releasable securing mechanism, shown as a snap lock line block assembly, in accordance with an embodiment of the present disclosure.

FIG. 1 is an isometric view of a releasable securing mechanism, shown as a snap lock line block assembly 10 in accordance with at least one embodiment. The illustrated line block assembly 10 has mating top and bottom portions 12 and 14 that have similar mating constructions and that when pressed together snap into a releasable locked configuration. Each of the top and bottom portions 12 and 14 has a bracket member 16 connected to a perimeter portion 17 of a core 18. The core 18 of the illustrated embodiment is an elastomeric member configured to attach to, support, or otherwise engage a cable, tube, line, or other structure to be supported, captured, or otherwise engaged by the line block assembly 10. The core 18 can have one or more receiving areas 20, shown as semi-cylindrical receptacles configured to receive at least a portion of a cylindrical member. Other embodiments can have cores 18 with other arrangements and configurations to hold or otherwise attach to other selected members.

The illustrated brackets 16 on the top and bottom portions 12 and 14 each have a similar construction, and the following description of one bracket 16 is applicable to the other bracket. The illustrated bracket 16 is a unitary metal band, such as a steel band, although the bracket 16 of other embodiments can be made of other metal, plastic, composites, or other suitable material. The bracket 16 has a generally U-shape and extends around a periphery of the core 18. The bracket 16 has a central portion 22 with a pair of spaced apart flanges 24 configured to help capture and/or retain the core 18 within the bracket 16. The central portion 22 is attachable to a selected payload or other mounting structure to which the line block assembly may be connected. In the illustrated embodiment, the central portion 22 has an aperture 26 that can receive a fastener or other mechanism to securely hold the top or bottom portion 12 or 14 to the selected payload or other structure. In other embodiments, the bracket's central portion 22 can have other configurations that allow for attachment to a support member, payload or other structure. Further, the bracket 16 may have other shapes for receiving and engaging the respective core 18.

The bracket 16 has a first leg portion 28 connected to the central portion 22 and extending along one side of the core 18. A female end tab 30 is integrally connected to the end of the first leg portion 28 and is oriented substantially perpendicular to the first leg portion and to the side of the core 18. This female end tab 30 has a T-shaped receiving aperture 32 defined by a primary opening 36 and a keyway 38 extending away from the primary opening 36 in a direction away from the core 18. The primary opening 36 has a first width, and the keyway 38 has a second width narrower than the first width, such that the keyway 38 and primary opening 36 have a generally T-shaped configuration. In the illustrated embodiment, the primary opening 36 is defined by a pair of opposing side surfaces 40 oriented generally perpendicular to the first leg portion 28, a first end surface 42 extending between the side surfaces 40 and positioned closest to the first leg portion 28, and an interrupted second end surface 44 opposite the first end surface 42 and in direct communication with the keyway 38. The keyway 38 is open to the primary opening 36 at the interrupted second end surface 44 and is defined by a pair of side surfaces 46 generally parallel to the primary opening's side surfaces 40, and an end surface 48 parallel to and opposite the primary opening's first end surface 42. As discussed in greater detail below, the primary opening 36 is configured to receive and deflect a portion of a male detent member 52, and the keyway 38 is configured to receive a portion of the male detent member 52 therein to retain the male and female portions together in a releasably locked configuration.

Figure 2:
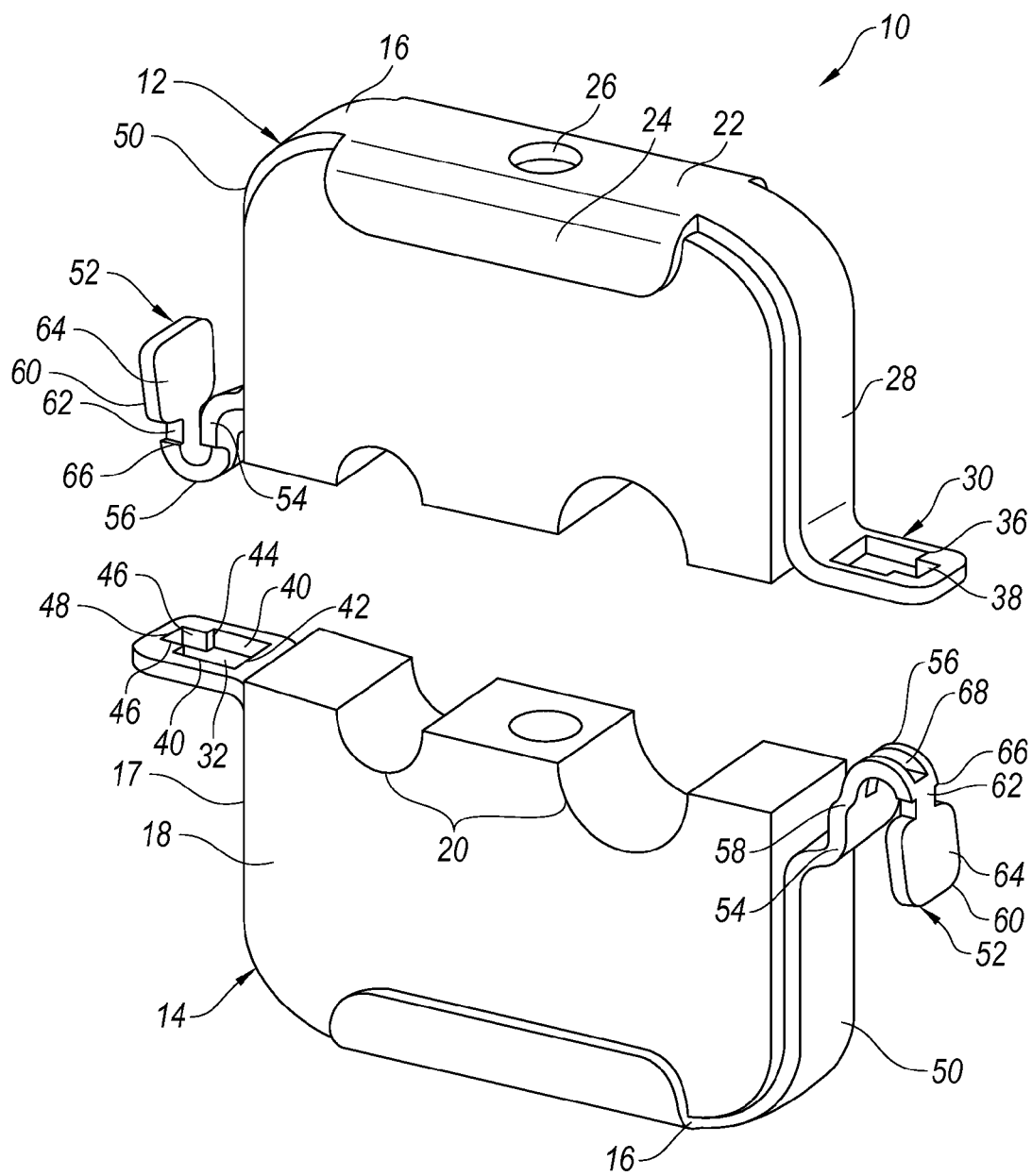
FIG. 2 is a partially exploded isometric view of the securing mechanism of FIG. 1.
Figure 3:
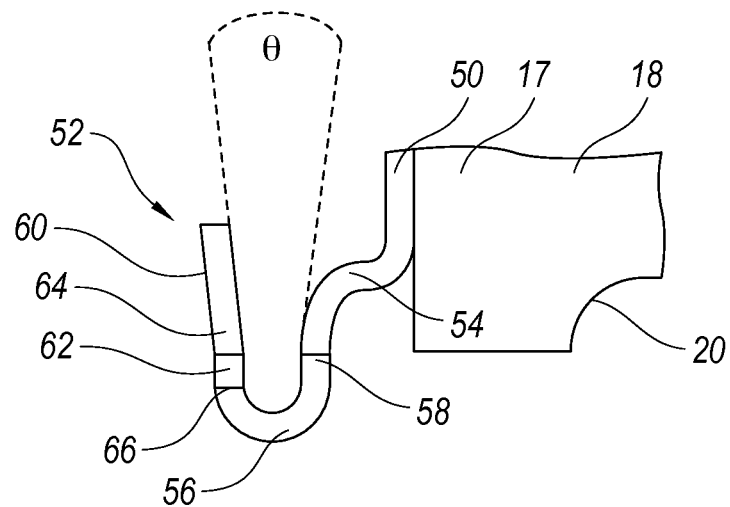
FIG. 3 is an enlarged elevation view of a male detent member of the securing mechanism of FIG. 1.
Figure 4:
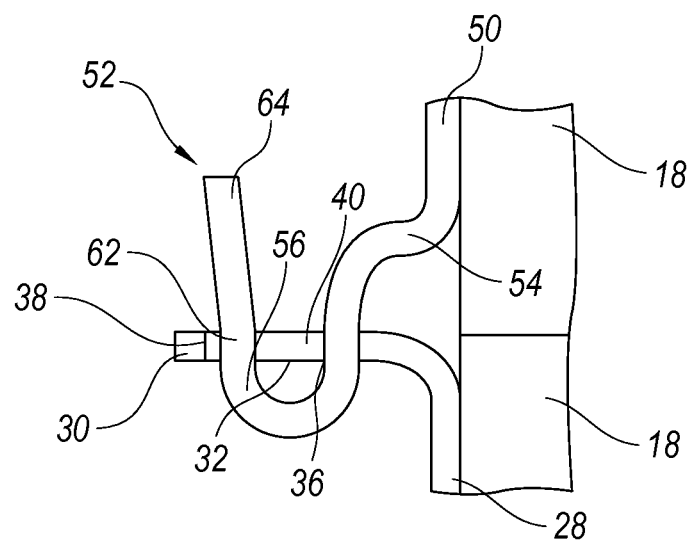
FIG. 4 is an enlarged cross-sectional view of the male detent member and female end tab of the line block assembly of FIG. 1.

The bracket 16 has a second leg portion 50 extending along the other side of the core 18 opposite and generally parallel to the first leg portion 28. The second leg portion 50 integrally is connected to the male detent member 52 generally opposite the female end tab 30. The male detent member 52 of each bracket 16 is shaped, sized, and configured to releasably snap together with the female end tab 30 of the other bracket 16 of the line block assembly 10. As best seen in FIGS. 2 and 3, the male detent member 52 has a proximal portion 54 integrally connected to the end of the second leg portion 50. The proximal portion 54 has a width greater than the width of the primary opening 36 (i.e., the distance between the opposing side surfaces 40). The proximal portion 54 is connected to a generally U-shaped intermediate portion 56 that has a width less than the width of the primary opening 36 (i.e., the distance between the opposing side surfaces 40). Accordingly, the transition between the proximal portion 54 and the U-shaped intermediate portion 56 defines a pair of shoulders 58 that will not fit through the primary opening 36. The width of the intermediate portion 56 is greater than the width of the keyway 38 (i.e., the distance between the side surfaces 46). Accordingly, the intermediate portion 56 can extend at least partially through the primary opening 36, but is too large to fit into the keyway 38.

The male detent member 52 has a distal portion 60 with a necked down portion 62 integrally connected to the end of the U-shaped intermediate portion 56. The distal portion 60 also has an enlarged head portion 64 integrally connected to the necked down portion 62 and spaced apart from the proximal portion 54. Accordingly, the necked down portion 62 is between the head portion 64 and the intermediate portion 56. The necked down portion 62 is narrower than the keyway 38 and has a length greater than the thickness of the material forming the female end tab 30. The head portion 64 has a width greater than the width of the primary opening 36 and greater than the width of the keyway 38. Accordingly, the transition between the necked down portion 62 and the head portion 64 defines a pair of shoulders 66, so that the head portion 64 will not fit through the primary opening 36 and the shoulders 66 will engage and be blocked by the female end tab 30 adjacent to the primary opening 36.

The male detent member 52 of the illustrated embodiment is configured to flex between a first, relaxed position shown in FIG. 3, and a second, partially compressed position. In the first, relaxed position, the distal portion 60 and the proximal portion 54 are oriented at a relatively shallow angle θ relative to each other. The U-shaped intermediate portion 56 is a resilient structure that can elastically flex and allow the distal portion 60 to move closer to the proximal portion 54, thereby reducing the angle θ when the distal portion 60 is in the second, partially compressed position. The intermediate portion 56 biases the male detent member 52 toward the first, relaxed position. In the illustrated embodiment, the intermediate portion 56 has a slot 66 therein along the bottom of the intermediate portion's bend to allow for easier flexing. Accordingly, the stiffness of the intermediate portion 56 can be controlled during manufacture by using a larger or smaller slot, and/or the controlling the thickness and material characteristics of the male detent member 52, for example, at the intermediate portion 56.

As seen in FIGS. 1 and 2, in operation the top and bottom portions 12 and 14 of the line block assembly 10 can be separated from each other, wherein each male detent member 52 is out of engagement with the corresponding female end tab 30. In this separated position, the male detent member 52 is in the first, relaxed position. The top and bottom portions 12 and 14 can be releasably interlocked with each other by moving the male detent member 52 into engagement with the respective female end tab 30 by pushing the U-shaped intermediate portion 56 into the primary opening 36. During this interface, the intermediate portion 56 presses and slides against the first and second end surfaces 42 and 44 of the primary opening 36, such that the male detent member 52 is moved from the first, relaxed position to the second, compressed position. As the male detent member 52 is pressed into the female end tab 30, a user can manually press against the head portion 64 to help decrease the angle θ to make interconnecting the components easier. In other embodiments, additional pressure against the enlarged head portion 64 is not applied.

The male detent member 52 is pressed into the female end tab 30 until the U-shaped intermediate portion 56 is pushed through the primary opening 36 and the necked down portion 62 of the distal portion 60 is in alignment with the keyway 38. When the necked down portion 62 is in alignment with the keyway 38, the biasing U-shaped intermediate portion 56 causes the necked down portion 62 to snap or otherwise move into the keyway 38 such that the end of the intermediate portion 56 is on one side of the female end tab 30 adjacent to the keyway 38, and the head portion 64 of the male detent member 52 is on the opposite side of the female end tab 30 adjacent to the keyway 38. In the illustrated embodiment, when the male detent member 52 snaps into the keyway 38, and audible click and/or a tactile indication may be generated, thereby indicating to the user that the male and female components releasably are fully engaged and locked together. When the necked down portion 62 is positioned in the keyway 38, the male detent member 52 can be in the first, relaxed position or in a partially biasing intermediate locked position, wherein the male detent member 52 urges against the female end tab 30 in the keyway 38. In this releasable locked position, the interface between the keyway 38 and the head portion 64 blocks the male detent member 52 from inadvertently pulling out the female receiving tab 30.

The male detent member 52 and its mating female end tab 30 can be manually unlocked or released from each other and separated by pressing against the head portion 64 toward the proximal portion 54 and/or the second leg portion 50. This movement of the head portion 64 causes the intermediate portion 56 to flex, thereby decreasing the angle θ and moving the necked down portion 62 out of the keyway 38 and into the primary opening 36. The U-shaped intermediate portion 56 can then be moved away from the female end tab 30 and out of the primary opening 36 until the male detent member 52 is separated from the female end tab 30. The male detent member 52 can be released and allowed to return to its first, relaxed position, so as to be ready to be inserted into and releasably connected to a mating female end tab 30.

The embodiment illustrated in FIGS. 1 and 2 show brackets 16 with a female end tab 30 on one side and a male detent member 52 on the other side. In another embodiment, one bracket 16 can be configured with only the female end tab 30 or the male detent member 52. The other bracket 16 can be configured with the mating other one of the male detent member 52 or the female end tab 30, such that the two brackets are releasably lockable together using only one mating pair of the male and female locking components. In another embodiment, a bracket 16 can have a hinged or articulatable middle section that may facilitate opening and closing of the bracket.

Figure 5:
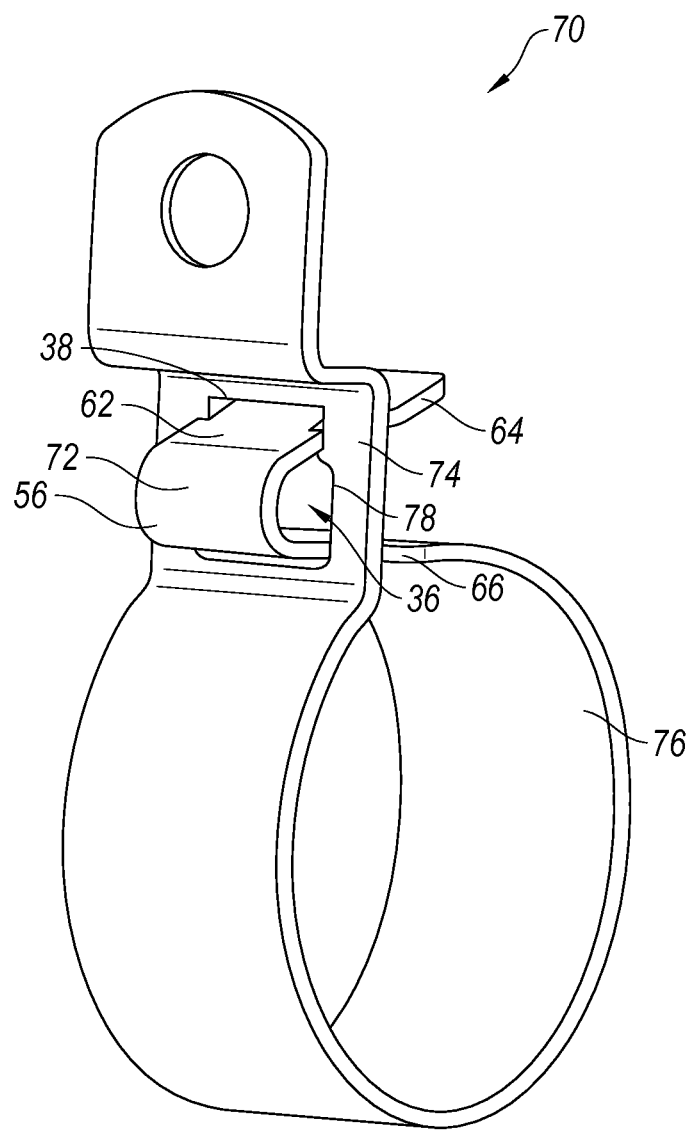
FIG. 5 is a front isometric view of a releasable securing mechanism, shown as a cable clamp, in accordance with another embodiment of the disclosure.
Figure 6:
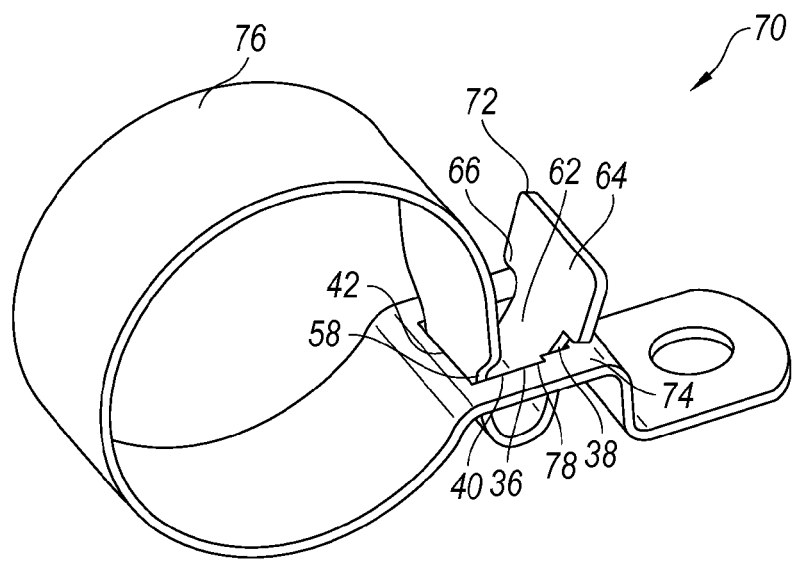
FIG. 6 is a rear isometric view of the cable clamp of FIG. 5.
Figure 7:
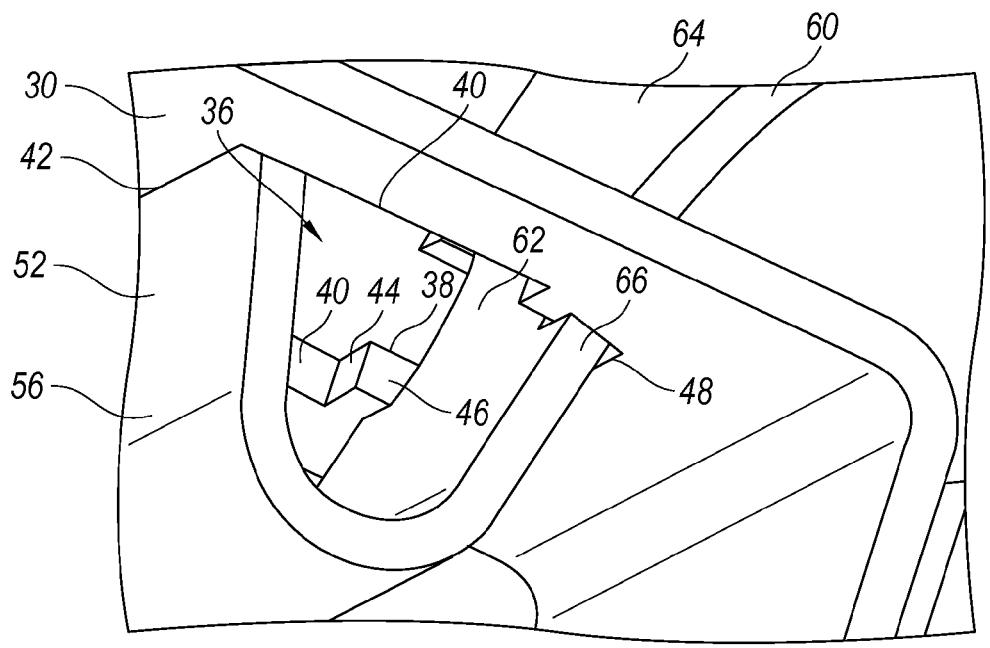
FIG. 7 is an enlarged isometric view of the male detent member and female end tab of the cable clamp of FIG. 5.
Figure 8:
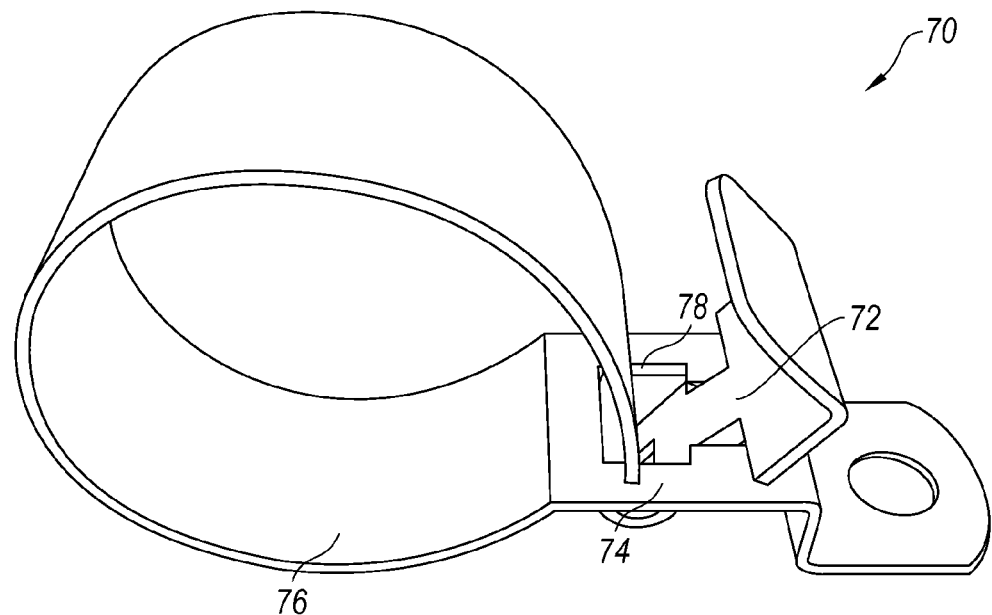
FIG. 8 is a front isometric view of another embodiment of a cable clamp in accordance with the present disclosure.
Figure 9:
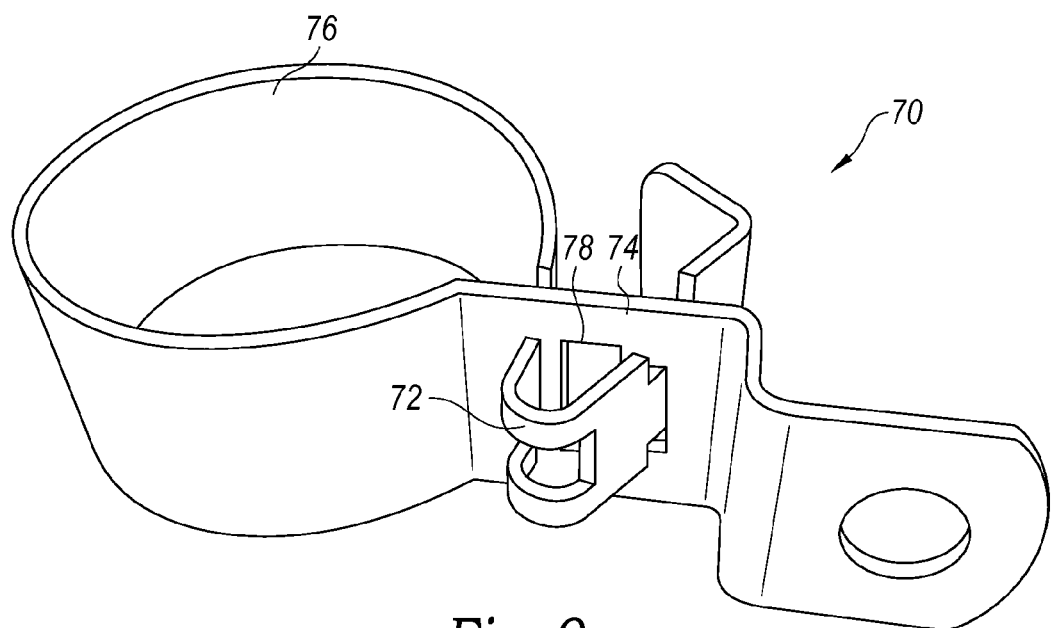
FIG. 9 is a rear isometric view of the cable clamp of FIG. 8.
Figure 10:
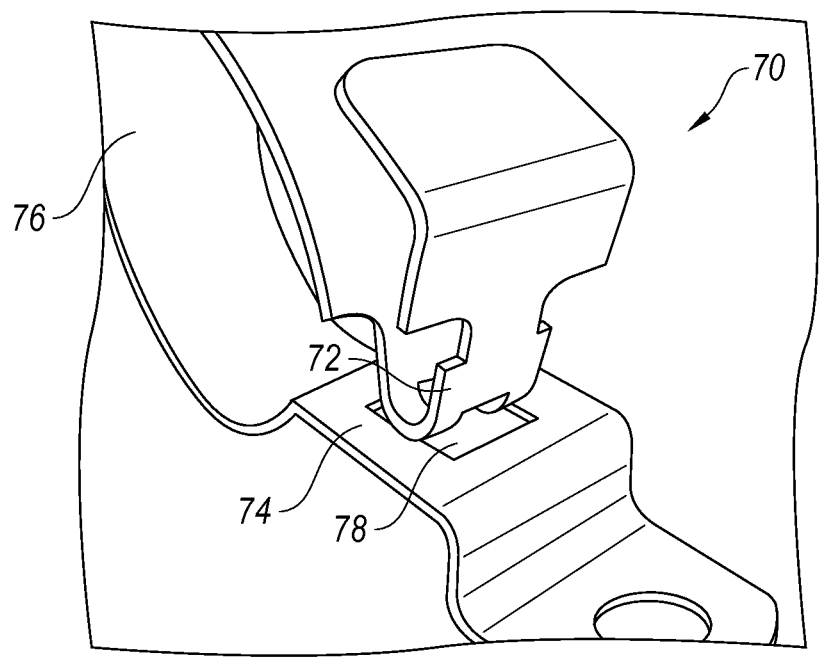
FIG. 10 is an isometric view of the male detent member and female end tab of the cable clamp of FIG. 8, shown in an unlocked, released position.

FIGS. 5-7 show another embodiment of the releasable securing mechanism in accordance with aspects of the present invention. The illustrated releasable securing mechanism is shown as a unitary cable clamp 70 having a male detent member 72 on the one end with substantially the same construction as the male detent member 52 described above. The cable clamp 70 has a female receiving portion 74 spaced apart from the male detent member 72 by an intermediate portion 76. The female receiving portion 74 has a T-shaped receiving aperture 78 that is substantially identical to T-shaped receiving aperture 32 in the female end tab 30 discussed above. The illustrated cable clamp 70 also has an attachment portion 80 connected to the female receiving portion 74 that allows the cable clamp 70 to be fixed to a payload or other suitable mounting structure. In the illustrated embodiment, the intermediate portion 76 defines a circular band integrally connected to the male detent member 72 and the female receiving portion 74 so as to allow the male detent member 72 and female receiving portion 74 to be clipped together in the releasable, locked position discussed above and shown in FIGS. 8-9. The male detent member 72 and the female receiving portion 74 can be released and moved to an open position (FIG. 10), thereby opening the clamp and allowing access into the circular area defined by the intermediate portion 76.

Figure 11:
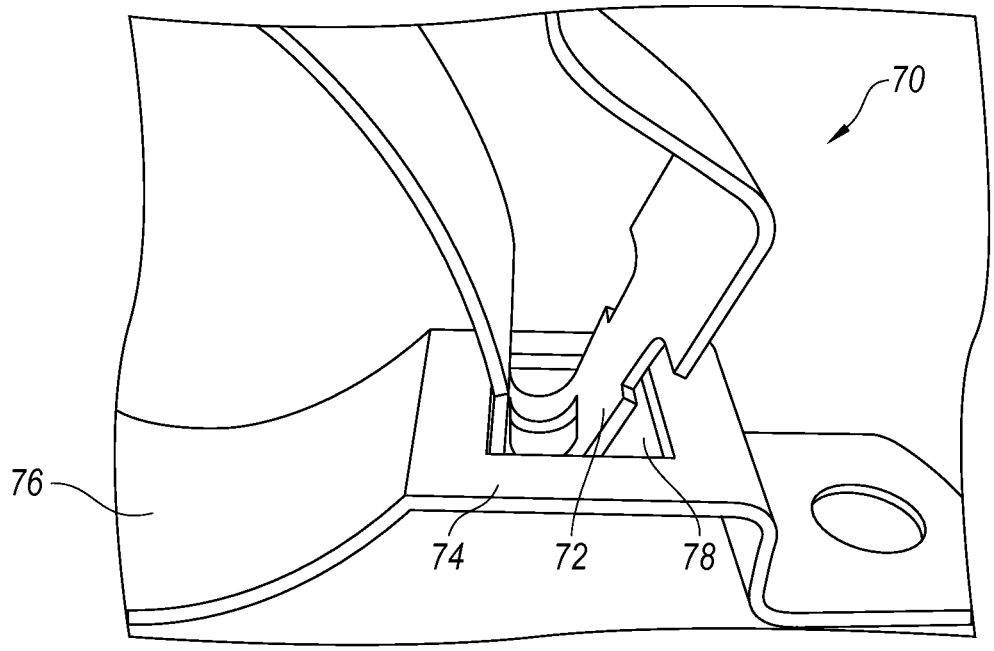
FIG. 11 is an isometric view of the male and female components of FIG. 10 in an intermediate position between released and locked positions.
Figure 12:
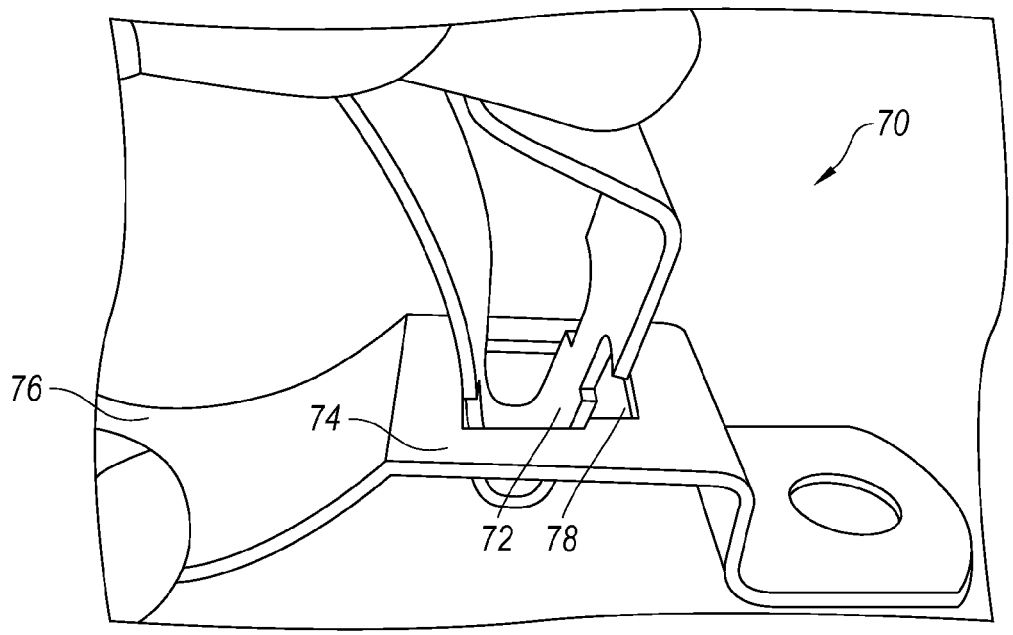
FIG. 12 is an isometric view of the male detent member and female end tab of FIG. 10 with the male detent member shown in a partially compressed position.
Figure 13:
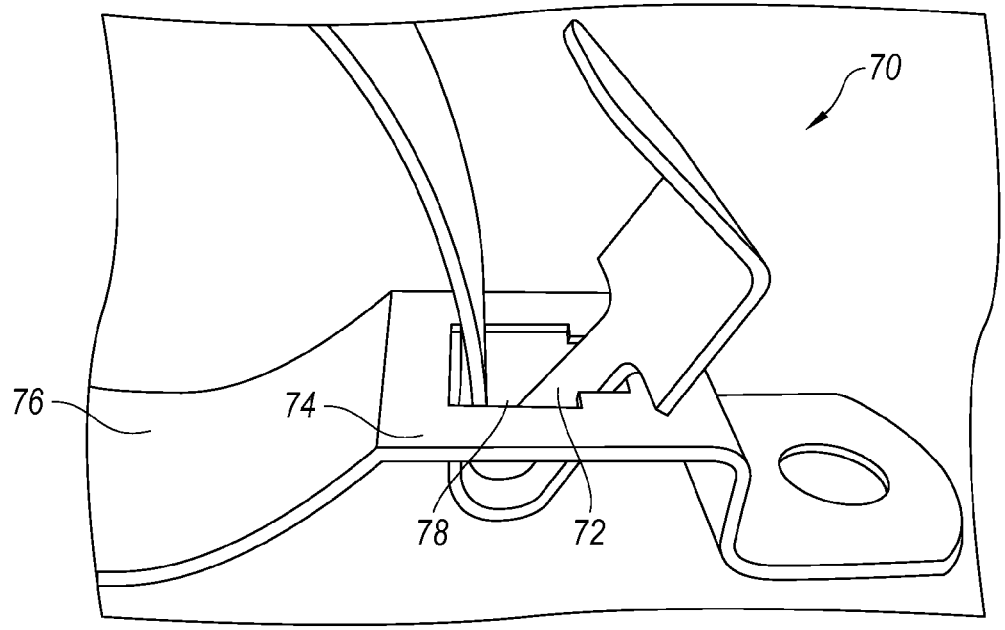
FIG. 13 is an isometric view of the male detent member and female end tab of FIG. 10 in an engaged, locked position.

Operation of the releasable locking feature of the cable clamp 70 is similar to the operation of the embodiment described above, wherein the cable clamp 70 can be moved from the open position (FIG. 10) through an intermediate position (FIG. 11). When the male detent member 72 is pushed into the primary opening 36 of the female receiving portion 74, the male detent member 72 flexes and reduces the angle θ of the intermediate portion 76. When the intermediate portion 76 moves through the primary opening 36 and aligns the necked down portion 62 with the keyway 38, the male detent member 72 snaps into the closed, locked position, resulting in an audible "click" and/or a tactile indicator to a user of reaching the closed, locked position. The male detent member 72 can be released from the female receiving portion 74 in the manner discussed above, thereby allowing the male detent member 72 to be moved away from the female receiving portion 74 to provide access into the area within the generally circular cable clamp 70. The cable clamp 70 can be made from a resilient metal, plastic, composites or other suitable material. While the illustrated embodiment has a continuous band with an integral male detent member 72 and integral female receiving portion 74, other embodiments can provide a hinge or articulation portion in or adjacent to the intermediate portion 76 that facilitates opening and closing of the clamp member 70.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

I claim:

1. A line retention device for use with one or more selected lines, comprising a retention bracket assembly having releasably engageable first and second end portions and a middle portion therebetween, the retention bracket being movable between an open position wherein the first and second end portions are out of engagement with each other and a closed position wherein the first and second end portions are in releasable engagement with each other with the retention bracket configured to retain the one or more selected lines therein, the first end portion having a female detent having a receiving aperture defined by a primary opening and a keyway extending away from the primary opening, wherein the primary opening has a first width and the keyway has a second width narrower than the first width, the second end portion having a male detent with a proximal portion, a head portion, and an intermediate portion connected to the proximal and head portions, the intermediate portion being sized to extend at least partially through the receiving aperture when the retention bracket is in the closed position, the proximal and head portions being wider than the first width of the primary opening and being sized to not fit through the primary opening, the intermediate portion having a third width less than the first width of the primary opening and greater than the second width of the keyway, the intermediate portion having a necked down portion connected to the head portion and spaced apart from the proximal portion, wherein the necked down portion has a fourth width narrower than the second width of the keyway, and when the retention bracket is in the closed position the intermediate portion extends through the receiving aperture with the necked down portion positioned in the keyway with the intermediate portion positioned on one side of the female detent adjacent to the keyway, and the head portion and the proximal portion positioned on an opposite side of the female detent adjacent to the keyway, and wherein the intermediate portion is configured to flex between a first, relaxed position with the necked down portion in the keyway so the male detent is blocked from moving out of the female detent portion and a second release position wherein the necked down portion is out of the keyway and aligned with the primary opening so the male detent can pass through the primary opening to move the retention bracket from the closed position to the open position.

2. The line retention device of claim 1 wherein the retention bracket assembly is a unitary member with the first and second end portions and the middle portion integrally interconnected.

3. The line retention device of claim 1, further comprising an elastomeric core having an interior engagement portion configured to engage the one or more selected lines and having perimeter portion attached to the middle portion of the retention bracket assembly.

4. The line retention device of claim 3 wherein the middle portion has a pair of spaced apart parallel flanges engaging the core and retaining the core on the retention bracket assembly.

5. The line retention device of claim 1 wherein the receiving aperture is a T-shaped receiving aperture.

6. The line retention device of claim 1 wherein the intermediate portion is a U-shaped intermediate portion.

7. The line retention device of claim 1 wherein the middle portion of the retention bracket assembly has a connection portion configured to releasably connect to a support structure.

8. The line retention device of claim 1 wherein the retention bracket assembly has independent first and second bracket portions, the first bracket portion includes the first end portion and the female detent is a first female detent, and the second bracket portion includes the second end portion and the male detent is a first male detent that releasably engages the first female detent, the first bracket portion having a third end portion opposite the first end portion, and the third end portion has a second male detent having a configuration substantially identical to the first male detent, and the second bracket portion has a fourth end portion opposite the second end portion, and the fourth end portion having a second female detent substantially identical to the first female detent, wherein the second male and female detents are releasably engaged with each other when the retention bracket is in the closed position, and the second male and female detents being disengageable from each other to move the retention bracket to the open position.

9. The line retention device of claim 8, further comprising an elastomeric core having independent first and second core portions, the first core portion attached to the first bracket portion and the second core portion attached to the second bracket portion and being moveable with the second bracket portion as a unit away from the first core portion when the retention bracket assembly is in the open position.

10. The line retention device of claim 9 wherein the first core portion has a first line receiving portion and the second core portion has a second line receiving portion facing the first line receiving portion when the retention bracket assembly is in the closed position, wherein the first and second line receiving portions are configured to retain the one or more selected lines therebetween.

11. The line retention device of claim 1 wherein the retention bracket assembly has independent first and second bracket portions, the first bracket portion includes the first end portion and the female detent is a first female detent, and the second bracket portion includes the second end portion and the male detent is a first male detent that releasably engages the first female detent, the first bracket portion having a third end portion opposite the first end portion, and the third end portion has a second female detent having a configuration substantially identical to the first female detent, and the second bracket portion has a fourth end portion opposite the second end portion, and the fourth end portion having a second male detent substantially identical to the first male detent, wherein the second male and female detents are releasably engaged with each other when the retention bracket is in the closed position, and the second male and female detents being disengageable from each other to move the retention bracket to the open position.

12. A line retention device for use with one or more selected lines, comprising
   a core portion having an interior engagement portion configured to engage and hold the one or more selected lines, the core portion having an outer perimeter area;
   a retention bracket connected to at least a portion of the perimeter area of the core portion, the retention bracket having releasably engageable first and second end portions and a middle portion therebetween, the retention bracket being movable between an open position wherein the first and second end portions are out of engagement with each other and a closed position wherein the first and second end portions are in releasable engagement with each other, the first end portion having a female detent with a receiving aperture defined by a primary opening and a keyway extending away from the primary opening, wherein the primary opening has a first width and the keyway has a second width narrower than the first width, the second end portion having a male detent with a proximal portion, a head portion, and an intermediate portion connected to the proximal and head portions, the intermediate portion being sized to extend at least partially through the receiving aperture when the retention bracket is in the closed position, the proximal portion and head portion being wider than the first width of the primary opening and sized to not fit through the primary opening, the intermediate portion having a third width less than the first width of the primary opening and greater than the second width of the keyway, the intermediate portion having a necked down portion connected to the head portion and spaced apart from the proximal portion, wherein the necked down portion has a fourth width narrower than the second width of the keyway, and when the retention bracket is in the closed position the intermediate portion extends through the receiving aperture with the necked down portion positioned in the keyway with the intermediate portion positioned on one side of the female detent adjacent to the keyway, and the head portion and the proximal portion positioned on an opposite side of the female detent adjacent to the keyway, and wherein the intermediate portion is configured to flex between a first, relaxed position with the necked down portion in the keyway so the male detent is blocked from moving out of the female detent and a second release position wherein the necked down portion is out of the keyway and aligned with the primary opening so the male detent can pass through the primary opening to move the retention bracket from the closed position to the open position.

13. The line retention device of claim 12, wherein the middle portion has a pair of spaced apart parallel flanges engaging the core and retaining the core on the retention bracket assembly.

14. The line retention device of claim 12 wherein the receiving aperture is a T-shaped receiving aperture.

15. The line retention device of claim 12 wherein the middle portion of the retention bracket assembly has a connection portion configured to releasably connect to a support structure.

16. The line retention device of claim 12 wherein the retention bracket assembly has independent first and second bracket portions, the first bracket portion includes the first end portion and the female detent is a first female detent, and the second bracket portion includes the second end portion and the male detent is a first male detent that releasably engages the first female detent, the first bracket portion having a third end portion opposite the first end portion, and the third end portion has a second male detent having a configuration substantially identical to the first male detent, and the second bracket portion has a fourth end portion opposite the second end portion, and the fourth end portion having a second female detent substantially identical to the first female detent, wherein the second male and female detents are releasably engaged with each other when the retention bracket is in the closed position, and the second male and female detents being disengageable from each other to move the retention bracket to the open position.

17. The line retention device of claim 16 wherein the core portion has independent first and second core portions, the first core portion is attached to the first bracket portion and the second core portion is attached to the second bracket portion and is moveable with the second bracket portion as a unit away from the first core portion when the retention bracket assembly is in the open position.

18. The line retention device of claim 17 wherein the first core portion has a first line receiving portion and the second core portion has a second line receiving portion facing the first line receiving portion when the retention bracket assembly is in the closed position, wherein the first and second line receiving portions are configured to retain the one or more selected lines therebetween.

19. The line retention device of claim 12 wherein the retention bracket assembly has independent first and second bracket portions, the first bracket portion includes the first end portion and the female detent is a first female detent, and the second bracket portion includes the second end portion and the male detent is a first male detent that releasably engages the first female detent, the first bracket portion having a third end portion opposite the first end portion, and the third end portion has a second female detent having a configuration substantially identical to the first female detent, and the second bracket portion has a fourth end portion opposite the second end portion, and the fourth end portion having a second male detent substantially identical to the first male detent, wherein the second male and female detents are releasably engaged with each other when the retention bracket is in the closed position, and the second male and female detents being disengageable from each other to move the retention bracket to the open position.

20. A line retention device for use with one or more selected lines, comprising
 a core portion having an interior engagement portion configured to engage and hold the one or more selected lines, the core portion having an outer perimeter area;
 a retention bracket connected to at least a portion of the perimeter area of the core portion, the retention bracket having releasably engageable first and second end portions and a middle portion therebetween, the retention bracket being movable between an open position wherein the first and second ends are out of engagement with each other and a closed position wherein the first and second ends are in releasable engagement with each other, the first end portion having a female detent having a receiving aperture defined by a primary opening and a keyway extending away from the primary opening, wherein the primary opening has a first width and the keyway has a second width narrower than the first width, the second end portion having a male detent with a proximal portion, a head portion, and an intermediate portion connected to the proximal and head portions, the intermediate portion being sized to extend at least partially through the receiving aperture when the retention bracket is in the closed position, the proximal portion and head portion being wider than the first width of the primary opening and sized to not fit through the primary opening, the intermediate portion having a third width less than the first width of the primary opening and greater than the second width of the keyway, the intermediate portion having a distal necked down portion connected to the head portion and spaced apart from the proximal portion, wherein the distal necked down portion has a fourth width narrower than the second width of the keyway, and when the retention bracket is in the closed position the intermediate portion extends through the receiving aperture with the distal necked down portion disposed in the keyway with the intermediate portion positioned on one side of the female detent adjacent to the keyway, and the head portion and the proximal portion positioned on an opposite side of the female detent adjacent to the keyway, and wherein the intermediate portion is configured to flex between a first, relaxed position with the distal necked down portion in the keyway so the male detent is blocked from moving out of the female detent and a second release position wherein the distal necked down portion is out of the keyway and aligned with the primary opening so the male detent can pass through the primary opening to move the retention bracket from the closed position to the open position.

* * * * *